July 7, 1953  M. HOYAUX  2,644,918
VOLTAGE DOUBLER
Filed March 18, 1952  2 Sheets-Sheet 2
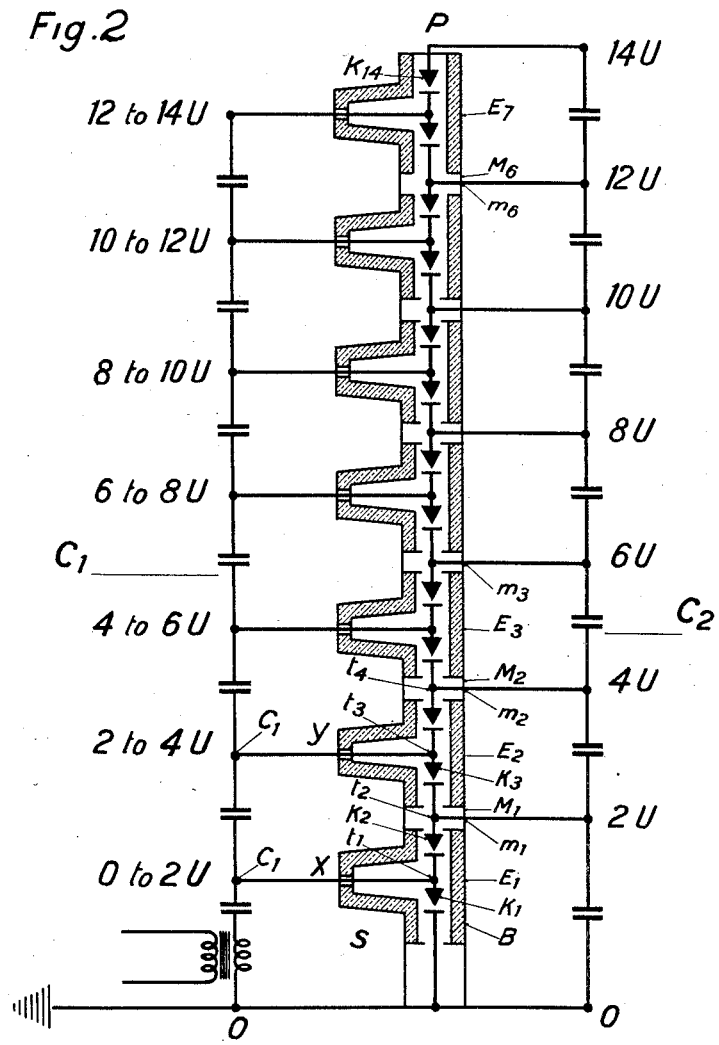
Fig.2
Fig.3
Inventor
Max Hoyaux
By Robert E. Burns
Attorney Patented July 7, 1953

2,644,918

UNITED STATES PATENT OFFICE 2,644,918

VOLTAGE DOUBLER

Max Hoyaux, Jamioulx, Belgium, assignor to Ateliers de Constructions Electriques de Charleroi, Brussels, Belgium, a corporation of Belgium Application March 18, 1952, Serial No. 277,261
In France March 21, 1951

6 Claims. (Cl. 321—15)

The present invention relates to devices commonly known as voltage-doublers for obtaining high direct current voltages from low alternating current voltages of supply.

It relates more particularly to an improvement in voltage-doubler circuit known as "Greinacher's" which is currently used for obtaining very high direct current voltages.

Greinacher's well-known circuit lay-out comprises in principle a certain number of stages connected electrically together, each stage including two condensers and two rectifiers arranged for full wave rectification. The first stage comprises, in addition, the secondary of a supply transformer the primary of which is connected to a low-tension source of alternating current, while the high direct current voltage is collected between the two extreme stages, this voltage being equal to as many times the double of the transformer secondary voltage as there are stages.

The rectifiers generally used are kenotrons, or high-vacuum rectifying diodes capable of a large output, and the several elements (condensers and diodes) of the Greinacher circuit are ordinarily arranged so that the condensers, provided with their insulating means, constitute two vertical columns, with the diodes connecting these two columns electrically at suitable points.

This well-known circuit arrangement is characterized in that:

(1) The total height of the columns is determined by the air insulation of the condenser electrodes or of the connections to these electrodes. Each condenser, except the first, supports a voltage equal at maximum to double the secondary voltage of the supply transformer. Consequently, the air gap between the two electrodes or their connections must be greater than the flash-over or by-pass distance for that voltage, and the total height of the column is at least equal to this distance multiplied by the number of stages;

(2) The diodes arranged horizontally or obliquely between the two columns, are of the sealed tube type, generally made of glass. It follows that when the cathode or filament of a diode is broken or worn out, or when entry of air takes place, the tube is useless and must be replaced.

Another method of arranging the elements of a Greinacher circuit lay-out, mitigating the disadvantage of the sealed diodes, consists in the use of a rectifier column arranged between the two columns of condensers, the rectifier column being perfectly airtight and exhausted permanently by suitable pumping means. This column comprises a stack of cylindrical rectifier units made of porcelain and jointed together by metallic parts serving for the electrical connections, each of the units constituting the enclosure vessel of a diode. All of the units are thus placed in communication so as to constitute a single enclosure vessel for all of the diodes.

This arrangement permits replacing the sealed glass diodes, fragile and useless after failure of the filament, by a column of robust elements made of porcelain, and constituting rectifiers with filaments which can be easily replaced.

However, this arrangement presents the disadvantage that its overall height is equal to double the height of the preceding arrangement, due to the fact that the total height of the column of rectifiers is determined by the air insulation of the external terminals of the diodes.

Since the voltage at the terminals of each rectifier varies from zero to twice the secondary voltage of the supply transformer, the air gap between the external terminals must be greater than the flash-over or by-pass distance for that voltage, and as there are two rectifiers one above the other in each stage, the total height of the column is at least equal to twice that distance multiplied by the number of stages.

If, therefore, the second arrangement is required to provide the same high direct current voltage as that furnished by the first arrangement, there will necessarily have to be used a column of rectifiers extending to a height double that of the columns of condensers in the initial arrangement.

Moreover, the columns of condensers will have to be of substantially the same height as the column of rectifiers, if it is desired to obviate intermediate connections of excessive length, although this increase in height may not be required in respect of insulation.

On the whole, the second arrangement has the advantage of eliminating the sealed glass kenotrons or diodes, but necessitates a height double that of the first lay-out.

The present invention relates to an improved arrangement of the Greinacher circuit, by which the kenotrons or diodes made of sealed glass are replaced by an exhausted column forming a common enclosure, robust and easily dismantled, in which the rectifiers are assembled. This arrangement preserves the same height as in the circuit lay-out with sealed kenotrons or diodes, all other things, particularly the supply and output voltages, remaining the same.

The invention also relates to a particular shape given to the porcelain elements which constitute the permanently exhausted column of rectifiers, for a Greinacher circuit.

According to this aspect of the invention, the

Greinacher circuit, having condensers arranged in two vertical columns, is characterized in that the rectifiers constitute a third vertical column, formed of hollow porcelain elements, the number of elements being equal to the number of stages provided in said circuit, each of said elements being T-shaped and constituting the common enclosure of the two rectifiers belonging to the same stage, all the elements being assembled so as to constitute an airtight enclosure for the column of rectifiers, a suitable low pressure being maintained permanently in the enclosure by vacuum pumps in communication with the said column.

The invention is hereinafter described with reference to the accompanying drawings, in which:

Fig. 2 represents schematically an improved arrangement of the Greinacher circuit.

Fig. 3 is a schematic top view of the rectifier column of Fig. 2.

Figure 1:
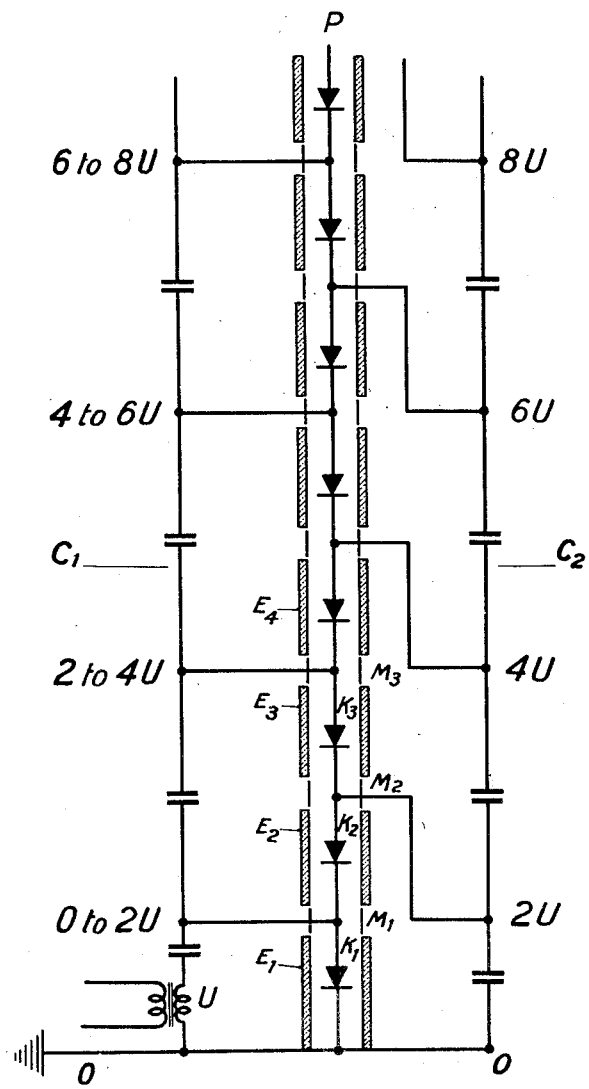
Fig. 1 represents schematically a portion of a Greinacher circuit in which the rectifiers constitute a vertical cylindrical column.

In Figs. 1 and 2, T designates a supply transformer, $C_1$ and $C_2$ designate respectively the two columns of condensers, and $K_1, K_2 \ldots K_{14}$ designate the several rectifiers. In Figs. 1 and 2, P designates the column constituting the common enclosure of the rectifiers. This column P comprises hollow elements $E_1, E_2$, etc., made of porcelain and connected together by metallic sleeves $M_1, M_2$, etc. (Fig. 1), or $M'_1, M'_2$, etc. (Fig. 2).

The arrangements of all these figures are shown diagrammatically, all detail not indispensable to the understanding of the invention having been omitted to simplify the drawings. Thus, for example, the vacuum pumping equipment for maintaining suitable low pressure in the columns P has not been shown. Moreover, the details of construction are diagrammatic and given merely by way of non-limiting example.

With the two arrangements represented in the drawings, the voltage at the terminals of the secondary winding of the supply transformer T is the same and designated by U, the number of stages is the same, viz. seven, and the direct current output voltage is consequently identical and equal to $V=14U$. It must however be noted that, in order to preserve the same scale and thus to provide a direct comparison of the height dimensions of the two arrangements, only the four first stages of the circuit have been shown in Fig. 1.

Lastly, there have been indicated upon the figures the values of the voltage, constant or variable, at the different junction points, the value being expressed as multiple of the secondary voltage of the supply transformer (0 to 2U, 2U, etc.).

The total height dimension of the Greinacher circuit lay-out according to each of the three arrangements will now be evaluated.

Let D be the minimum distance which it is necessary to separate two conducting members between which there exists a potential difference equal to 2U in order that there may be no breakdown of the air gap between the two members.

In the arrangement represented in Fig. 1, it is seen that the voltage across each condenser except the first of the column $C_1$ is equal to 2U, and the minimum distance to be provided between the electrodes or between the connections to the electrodes of a condenser is therefore D, so that the total height of the columns $C_1$ and $C_2$ is 7D in the case considered, or $n$D in the general case of $n$ stages. The rectifier column P will have to have twice the height of the minimum height necessary for the columns $C_1$ and $C_2$.

In fact, the voltage which exists at the terminals of each of the rectifiers $K_1, K_2$, etc., as, for example, between the points $M_1, M_2$, varies from 0 to 2U, so that the distance in air between these points must be at least equal to D.

Since the circuit includes two rectifiers per stage, one above the other, the height of the column P will be $2 \times 7D$ in the case considered or $2nD$ in the general case of $n$ stages. And, if it is desired to obviate excessive length of the connections to be established between the columns, the columns $C_1$ and $C_2$ will have to be substantially of the same height as the column P.

It follows that the arrangement according to Fig. 1 results in a height dimension double that of the minimum height of a known Greinacher circuit layout. It has, however, the advantage that it does not comprise individual sealed rectifiers, the latter being replaced by the porcelain column P which is more robust and can be exhausted continuously. Moreover, the unions between elements $E_1, E_2$, etc., may be formed in such a way that the interior of the column P shall be easily accessible to allow the replacement of worn or broken filaments.

These advantages are preserved in the improved arrangement according to the invention (Fig. 2), while the disadvantage of the double overall height is eliminated by the T-shape of the elements $E_1, E_2$, etc.

In the embodiment shown in Fig. 2, the rectifier column P is made up of a plurality of units or elements $E_1, E_2, E_3$, etc., each comprising a hollow T-shaped body of insulating material, e. g. porcelain having a cross or body portion B and a stem portion S. The cross portions B of the units are aligned and are separably joined end to end by suitable airtight couplings or unions represented by sleeves $M_1, M_2$, etc., to form a common enclosure for the rectifiers $K_1, K_2, K_3$, etc., there being two rectifiers in each unit. The rectifiers are connected in series and between successive rectifiers there are intermediate taps $t_1, t_2$, etc. Terminals X, Y, etc., are sealed into the outer ends of the stem portions of the T-shaped members and other terminals $m_1, m_2, m_3$, etc. are associated with the couplings $M_1, M_2$, etc., which may desirably be made of metal. The terminals in the stem portions are connected internally to alternate taps $t_1, t_3$, etc. of the rectifier column and externally to taps $c_1$ between successive condensers of the condenser column $C_1$. The terminals associated with the couplings are connected internally to the intervening taps $t_2, t_4$, etc., of the rectifier column and externally to taps $c_2$ between successive condensers of the condenser column $C_2$. The enclosure formed by the units $E_1, E_2, E_3$, etc., is evacuated, for example by a suitable vacuum pump.

Referring back to Fig. 1, it is noted in fact that the conditions of insulation require a distance D between $M_1$ and $M_2$, as well as between $M_2$ and $M_3$, while only the same distance is necessary between $M_1$ and $M_3$ because the voltage across all the condensers (except one) is constant and equal to 2U. If, therefore, the column P is arranged so that the distances $M_1$ to $M_2$ and $M_2$ to $M_3$ are horizontal, only the distance $M_1$ to $M_3$ remaining vertical, it is evident that a column of only half the height will be required.

This is what is done in the arrangement of Fig. 2, due to the T-shape of the elements $E_1, E_2$, etc., constituting the column P. The distance $x$ to M′$_1$, corresponding to the distance M$_1$ to M$_2$ of the preceding arrangement, is here disposed horizontally, as is also the distance M′$_1$ to Y corresponding to the distance M$_2$ to M$_3$. Only the distance X to Y, which corresponds to the distance M$_1$ to M$_3$ of the preceding arrangement, remains vertical.

It will be sufficient, to satisfy the requirements of insulation, to give the distances X to M′$_1$, M′$_1$ to Y, and X to Y, a value at least equal to D. Similarly, the distances M′$_1$ to M′$_2$, M′$_2$ to M′$_3$, etc., will have to be equal to D so that the height dimension of each of the elements E$_1$, E$_2$, etc., shall be equal to D.

Since each of these elements includes two rectifiers K$_1$, K$_2$, etc., and there are two rectifiers per stage, the total height of the column P will be 7D in the present case, or nD in the general case of n stages, the columns C$_1$ and C$_2$ thus preserving their minimum height, necessary as in the known Greinacher circuit layout.

It is seen, therefore, that the improved arrangement according to the invention of the elements of a Greinacher circuit leads to the same total height as the customary arrangement (Fig. 1) while eliminating the disadvantages pointed out above of the sealed kenotrons or diodes.

In actual construction, the height of the column P will be somewhat greater than the theoretical values indicated above because of the fact that the sleeves M′$_1$, M′$_2$, etc., forming unions between the elements E, E$_2$, etc., may desirably be formed of metal. The difference will depend on the specific construction of the unions and can easily be limited to 20% or 30% of the theoretical height, which is without serious disadvantage.

It will be understood that the invention is not limited to the specific construction shown and described but may be varied within the scope of the appended claims.

What I claim and desire to secure by Letters Patent is:

1. In a Greinacher voltage-doubler circuit having two condenser columns each comprising a plurality of condensers connected in series with intermediate taps between successive condensers, a rectifier column comprising an exhausted enclosure made up of a plurality of hollow T-shaped members disposed with the crosses of the T's coaxial and connected with the stems of the T's projecting laterally, a plurality of rectifiers disposed in said enclosure and connected in series with intermediate taps between successive rectifiers, a first series of terminals comprising a terminal at the outer end of each of the T stems, a second series of terminals comprising a terminal adjacent each junction between successive T crosses, the terminals of one series being connected internally to alternate rectifier taps and externally to the taps of one condenser column and the terminals of the other series being connected internally to the intervening rectifier taps and externally to the taps of the other of said condenser columns, the terminals of each series being spaced apart in the longitudinal direction of the enclosure a distance greater than the flash-over distance for the maximum voltage between successive condenser taps and the terminals of one series being spaced from those of the other series a substantially equal distance in a direction transverse to the length of said enclosure.

2. In a Greinacher voltage-doubler circuit having two condenser columns each comprising a plurality of condensers connected in series with intermediate taps between successive condensers, a rectifier column comprising an elongated exhausted enclosure, a plurality of rectifiers disposed in said enclosure and connected in series with intermediate taps between successive rectifiers, a series of connections extending from alternate rectifier taps to the exterior of said enclosure for connection to the taps of one condenser column, a second series of connections extending from the intervening rectifier taps to the exterior of the enclosure for connection to the taps of the other of said condenser columns, successive connections of each series being spaced apart in the longitudinal direction of the enclosure a distance greater than the flash-over distance for the maximum voltage between successive condenser taps and the connections of one series being spaced from those of the other series a substantially equal distance in a direction transverse to the length of said enclosure.

3. In a Greinacher voltage-doubler circuit having two condenser columns each comprising a plurality of condensers connected in series with intermediate taps between successive condensers, a rectifier column comprising an exhausted enclosure made up of a plurality of hollow T-shaped members disposed with the crosses of the T's aligned and with the stems projecting laterally, means joining successive crosses with an airtight joint, a pair of rectifiers in each member, a terminal at the outer end of each of the T stems, a terminal at each joint between successive members, said latter terminal being opposite the stem, internal connections between the terminals and the rectifiers and connections between the terminals and the respective taps of the condenser columns.

4. A rectifier column comprising a series of like units, each unit comprising a hollow T-shaped member of insulating material, rectifier elements mounted in said member, a terminal at the outer end of the stem portion of the T and connections between the terminal and the rectifier elements, said units being assembled with the cross portions of the T's in alignment and coupling means separably joining said units with an airtight joint.

5. A rectifier column comprising a series of like hollow T-shaped members of insulating material assembled with the cross portions of the T's end to end and the stem portions of the T's projecting laterally, couplings separably connecting said members with airtight connections, rectifier elements mounted in said members, a terminal at the outer end of the stem portion of each of said members, a terminal at each of said couplings and electrical connections between said terminals and said rectifier elements.

6. A rectifier column comprising a series of like hollow members of insulating material having aligned tubular portions and laterally projecting branch portions, rectifier elements mounted in said members, coupling means separably joining said tubular portions end to end with airtight joints, terminals sealed in said members at the ends of said laterally projecting branch portions and connections between said terminals and said rectifier elements.

MAX HOYAUX.

References Cited in the file of this patent

UNITED STATES PATENTS

| Number | Name | Date |
|---|---|---|
| 2,243,941 | Bouwers | June 3, 1941 |